United States Patent [19]

Aviles et al.

[11] Patent Number: 4,478,089

[45] Date of Patent: Oct. 23, 1984

[54] TRI-AXIAL FORCE TRANSDUCER FOR A MANIPULATOR GRIPPER

[75] Inventors: Henry E. Aviles, Pompano Beach; Jane A. Gregory; Hugo A. Panissidi, both of Boca Raton; Henry E. Wattenbarger, Lake Worth, all of Fla.

[73] Assignee: International Business Machines Corp., Armonk, N.Y.

[21] Appl. No.: 393,259

[22] Filed: Jun. 29, 1982

[51] Int. Cl.³ .............................................. G01L 5/16
[52] U.S. Cl. .............................. 73/862.04; 73/862.65; 901/46
[58] Field of Search ........... 73/862.04, 862.05, 862.06, 73/862.65, 862.67, 147, 117.4; 901/46

[56] References Cited

U.S. PATENT DOCUMENTS 4,132,318  1/1979  Wang et al. .................. 73/862.04 X
4,326,424  4/1982  Koenig ............................. 73/862.48

OTHER PUBLICATIONS

A. Heyser–"Entwicklung von Windkanaleinbauwaagen Mit Dehnungsmebstreifen Systemen", p. 33, May 1963.

*Primary Examiner*—Charles A. Ruehl
*Attorney, Agent, or Firm*—Harold H. Sweeney, Jr.

[57] ABSTRACT

A multi-degree of freedom force transducer is provided for measuring forces applied to gripper fingers in a manipulator when grasping an object therebetween. The transducer includes a pair of force sensor assemblies rigidly connected at a first end to a respective finger and at a second end to a drive member for the gripper. A plurality of parallel beam structures are contained in each of the force sensor assemblies, each consisting of a pair of flat parallel flexure members, each member bridging opposite sides of a gap in the structure. These parallel beam structures are oriented so that the axis perpendicular to the planar surfaces of the parallel flexure members are orthogonal to one another, providing the capability of measuring the force applied to an object held by the gripper in the X, Y and Z axial directions. A strain gage of a pair of strain gages is located at a predetermined opposite maximum flexure point of each flexure member of said parallel beam structures, so as to measure the flexure of the member at the predetermined flexure points, which flexure is indicative of the force vector along the axis perpendicular to the parallel flexure members. In another embodiment the junction between the flexure member and the wall of the strain gage assembly is radiused or curved so that the maximum flexure point is spread out, giving longer life and enhanced measurement accuracy.

11 Claims, 14 Drawing Figures

STRESS

A  DISTANCE ALONG BEAM  B

TRI-AXIAL FORCE TRANSDUCER FOR A MANIPULATOR GRIPPER

BACKGROUND OF THE INVENTION

This invention relates to force sensors for use in manipulator grippers and, more particularly, to tri-axial force sensors for measuring the forces applied along orthogonal axes to an object held in the gripper of a manipulator.

DESCRIPTION OF THE PRIOR ART

Computer controlled manipulators are now available which are capable of performing a variety of tasks such as mechanical assembly. One problem in these systems is that the forces developed at the gripper when an object is being held cannot be simply determined. For example, the manipulator gripper of U.S. Pat. No. 3,948,093 of Folchi et al for a 6-degree-of-freedom force transducer for a manipulator system employs pairs of strain gages mounted in I-beam modules to measure forces on the fingers. The I-beam modules are sensitive to moments as well as forces in the X, Y, Z orthogonal directions. These moment vector equations are complex and take up considerable valuable computer controlled system time.

U.S. Pat. No. 4,132,318 of Wang et al for an assymetric 6-degree-of-freedom force-transducer system for a computer-controlled manipulator system includes a gripper with a set of 3-degree-of-freedom force sensors on each finger, having strain gages and 90° shift in orientation of these sensors. It also includes an assymetric, off-set relationship of the location and orientation of analogous sensors on the two fingers in order to obtain different measurements from the two fingers. The structure is subject to twisting moments as was the case in Folchi et al.

SUMMARY OF THE INVENTION

The main object of this invention is to measure the gripping forces applied by a gripper to an object being held by the manipulator gripper fingers.

It is yet another object to provide a 3-degree-of-freedom structure which resolves a force vector applied to said gripper fingers into three orthogonal force components which are substantially free of any rotational moments.

It is a further object of the present invention to provide a force sensor for sensing orthogonal forces applied to the gripper when holding an object therein in which maximum flexure points in flexure members are spread out so as to increase the life thereof by decreasing the flexure metal fatigue and increasing the measurement accuracy.

It is a further object of the present invention to produce a force sensor for mounting between a manipulator gripper and drive means which is constructed from one piece by machining, molding, or the like, and is sufficiently rigid to resist motion due to torque forces.

It is yet a further object of the present invention to provide a force sensor which utilizes foil strain gages mounted in a flat flexible printed circuit.

Briefly, the invention comprises a unitary force sensor for measuring forces applied to gripped fingers in a manipulator or the like when grasping an object therebetween. The force sensor assembly is rigidly connected at a first end to a respective finger and at a second end to a drive member for the gripper. The assembly includes at least two and preferably three parallel beam structures, each of which comprises a pair of flat parallel flexure members, each bridging opposite sides of a gap in the structure. The parallel beam structures are oriented so that the axis perpendicular to the planar surfaces of the parallel flexure members are orthogonal to one another. A pair of strain gages is provided with a gage located at a predetermined opposite maximum flexure point of each flexure member and connected in a circuit so as to measure the flexure of the flexure member, which flexure is indicative of the force vector along the axis perpendicular to the plane of the parallel flexure members.

Another aspect of the invention consists of forming the junction between the flexure members and the walls of the force sensor unit in which the flexible members are located so as to spread out the maximum flexure points, thereby relieving the metal fatigue and providing longer life and better accuracy.

A yet further feature of the invention consists of locating the foil type strain gages in a flat, flexible printed circuit which can be wrapped around the force sensor assembly providing for a safer and neater, more compact arrangement.

DESCRIPTION OF THE PREFERRED EMBODIMENT

Figures 1A, 1B:
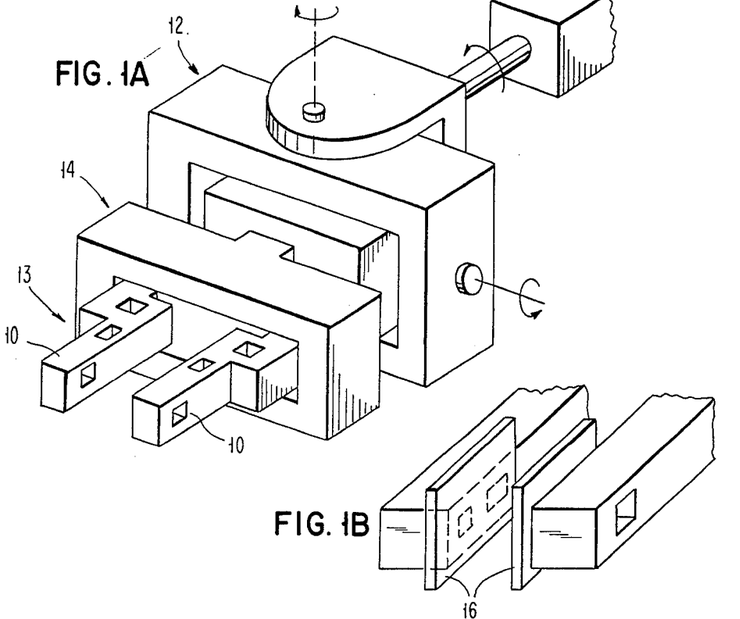
FIG. 1A is a perspective view showing the force sensors of this invention attached to the end of a manipulator arm.
FIG. 1B is a further perspective view showing the grippers or fingers of the hand mounted on the force sensors.

FIG. 1A shows the force sensor assemblies forming a gripper 13 extending from the end of a manipulator having roll, pitch and yaw capabilities. The arrangement includes a drive means 14 for driving the fingers or pads 16 carried by the force sensor assemblies toward one another. The manipulator arm 12 is capable of placing the fingers 16 of the gripper 13 on either side of an object to be picked up and the drive means 14 closes the fingers 16 to grasp the object. The purpose of the force sensor assemblies 10 connected between the drive means 14 and the fingers 16 is to sense the forces applied to the object by the gripper. The force to be applied to a particular object to be picked up by the gripper 13 is predetermined and the force sensor assemblies 10 are connected such that the actual force being applied is fed back to the drive means 14 to adjust the gripping force applied to the fingers 10. The gripper pads or fingers 16 are shown in FIG. 1B and are attached to the facing surfaces of the force sensor assemblies 10 near the outer end thereof.

Figure 2:
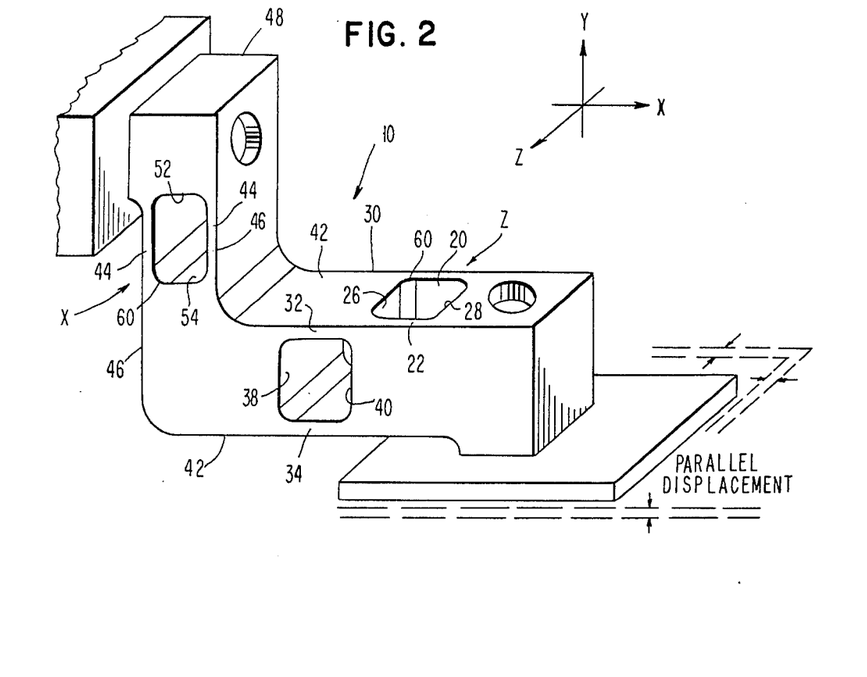
FIG. 2 is a blown-up schematic view of a force sensor of this invention showing the parallel displacement of the load plate or finger.

A blown-up view of a force sensor assembly 10 is shown in FIG. 2 indicating the parallel beam sensor structures X, Y and Z located therein. The parallel beam sensor structures X, Y and Z are arranged in the force sensor assembly 10 separated from one another and oriented therein at right angles to each other. The force sensor assembly 10 has, in this particular case, an L-shape with the Y and Z sensor structures arranged in the long portion of the L and the X sensor structure arranged in the short portion of the L. The Z sensor structure consists of a pair of beam or bridge members 20, 22 which extend across a gap from wall 26 to wall 28 in the side walls 30 of the structure. These beam or flexure members 20, 22 are relatively thin so that some flexing is possible but are thick enough to withstand torque or rotary motion. The flexure that takes place in the Z sensor is along the Z axis which is perpendicular to the plane of the flexure members. Any force in the Z direction will be resolved along the Z axis by the Z sensor parallel beam structure.

The Y sensor or Y parallel beam structure is oriented in the force sensor assembly 10 at right angles to the Z sensor. Thus, the beam members or flexure members 32 and 34 bridge a gap in the structure from wall 38 to wall 40 with the flexure members in the top and bottom surfaces 42 of the assembly. The flexure members 32 and 34, which remain parallel to one another, are thin, similar to the Z sensor flexure members so as to give flexing due to forces resolved along the Y axis which extends perpendicular to the plane of the flexure members.

The X sensor parallel beam structure consists of a pair of parallel beams 44 located in the top and bottom surfaces 46 of the short leg 48 of the L-shaped assembly bridging a gap from wall 52 to wall 54. So again, these flexure members or beam members 44 are sufficiently thin to flex under forces directed thereto through the assembly which are resolved along the X axis which extends perpendicular to the plane of the parallel beam flexure members. It should now be appreciated that applying a force at the load point or in the load point area will cause flexure of the various parallel beam members along the X, Y, Z axis. The force sensor assembly and the plate attached thereto are made sufficiently rigid so that the flexing of the structure and the corresponding movement of the plate or fingers should be in parallel planes. The three orthogonal parallel beam structures X, Y and Z are located in the L-shaped force sensing assembly as just described and provide a compact tri-axial force sensor arrangement that exhibits little or no coupling between axes. The monolithic construction provides strength and rigidity and allows flexure only where desired.

Figure 3:
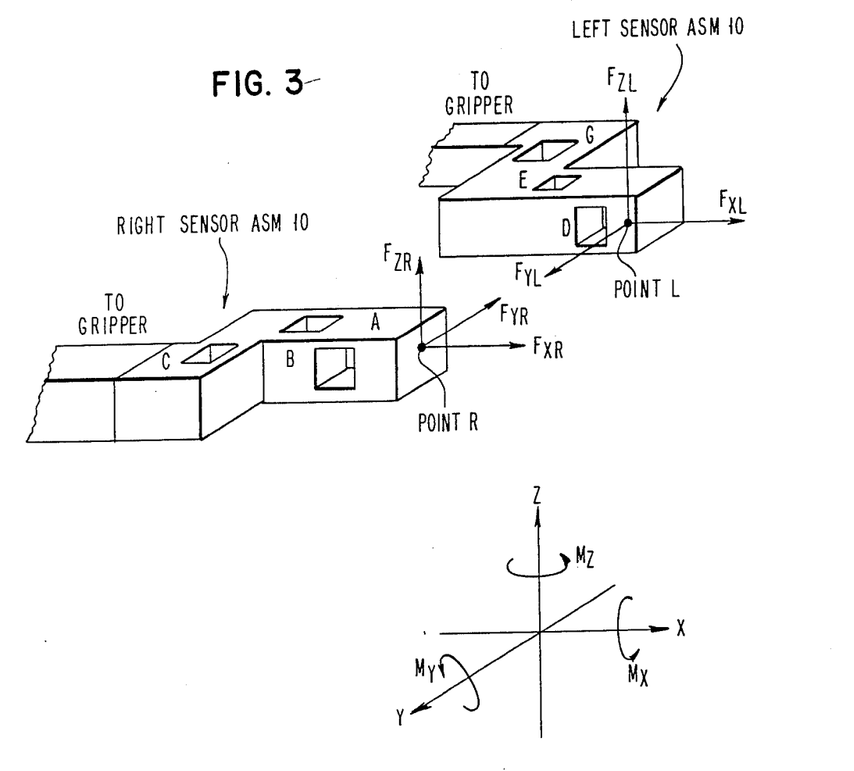
FIG. 3 is a perspective view showing the left and right force sensor of a gripper with the various force vectors caused by a load indicated thereon.

The flexure arrangement for a pair of force sensor assemblies is shown in FIG. 3. A force applied at a point R in the right hand sensor assembly 10 is resolved as follows: $F_A = F_{ZR}$, $F_B = F_{YR}$, $F_C = F_{XR}$. A force applied at point L is resolved as follows by the left hand sensor assembly 10: $F_D = F_{ZL}$, $F_E = F_{YL}$, $F_G = F_{XL}$. When the manipulator gripper 13 is holding an object between the gripper fingers 16, as shown in FIG. 3, the moment acting at the contact points R and L can be neglected, since this sensor design is not sensitive to those moments.

Figure 4:
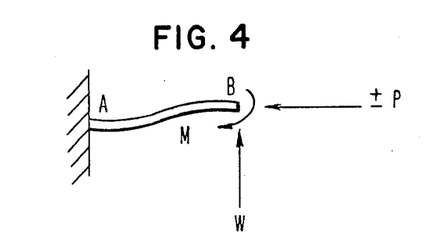
FIG. 4 is a schematic diagram showing the loads on a parallel beam flexure member.

Referring to FIG. 4, there is shown a schematic arrangement of the geometry of a flexure member. Each flexure member in a parallel beam flexure structure is loaded as is shown by the transverse force W. The maximum stress in the beam occurs at point A and B where the flexure member joins the gap wall. For this loading the stress is as follows:

$$\text{Max Stress} = \sigma_{max} = \frac{M_{max} C}{I} \text{ lb/in}^2$$

Where:
  $M_{max}$ is the maximum moment acting on the beam.
  C is half the beam thickness.
  I is the moment of inertia of the beam.
And $$M_{max} = \frac{W}{K} \tan\left(\frac{KL}{2}\right) \text{ lb } IN$$

Where:

$$K = \left(\frac{P}{EI}\right)^{\frac{1}{2}}$$

W = Transverse load on beam.
  P = Axial load on beam.
  E = Modulus of elasticity of beam material.
  I = Moment of inertia of the beam.
  L = Length of the beam.

Analysis of the parallel-beam construction has shown that $P \leq 2W$ in most applications. Therefore:

$$M_{max} = \frac{W}{\left(\frac{2W}{EI}\right)^{\frac{1}{2}}} \tan\left[\frac{(2W)^{\frac{1}{2}}}{(EI)} \frac{L}{2}\right]$$

For a typical application:
  W = 20 lbf
  L = 0.250 in.
  E = 30 × 10^6 lb/in$^2$
  I = 2.5 × 10$^{-7}$ in$^4$
For this range of numbers:

$$\text{Tan}\left[\left(\frac{2W}{EI}\right)^{\frac{1}{2}}\frac{L}{2}\right] \approx \left(\frac{2W}{EI}\right)^{\frac{1}{2}}\frac{L}{2}$$

So Mmax=(WL/2), which is the maximum moment for the case when P=0. Therefore, the effect of axial loads on the maximum stress can be neglected for this range of applications.

Figure 5:
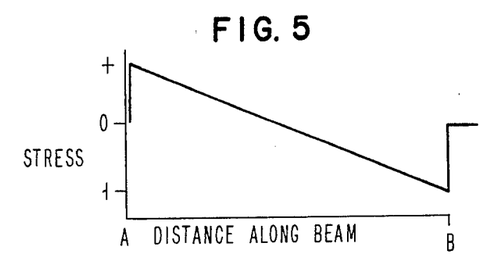
FIG. 5 is a plot of stress versus distance along the beam with respect to the flexure member of FIG. 4.

FIG. 5 shows a plot of the stress versus the distance along the beam from point A to point B, as shown in FIG. 4. It can be seen that the maximum stress point is a sharp point in the positive direction at point A and that similarly another maximum stress point is a sharp point in the negative direction at point B. It should be noted that these sharp stress points at the junctions where the flexure member joins the walls of the gap denoted by A and B in FIG. 4 lead to metal fatigue and, consequently, short life of the flexure member. To overcome this problem in the flexure members a radius 60 has been added to each of the beams or flexure members where they join the walls of the previously defined gaps in the force sensor assembly.

Figure 6:
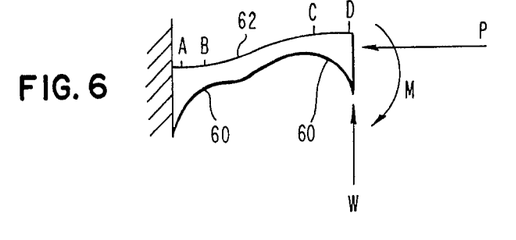
FIG. 6 is a schematic diagram showing the radiusing of the flexure member used in the force sensor of the present invention.
Figure 6A:
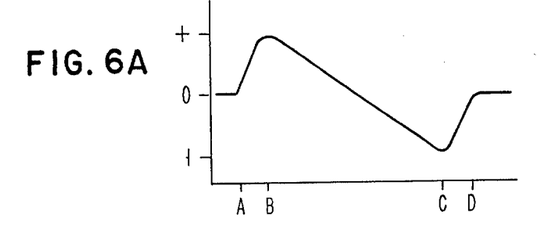
FIG. 6A is a plot of stress versus distance along the beam of the flexure member of FIG. 6.
Figure 7:
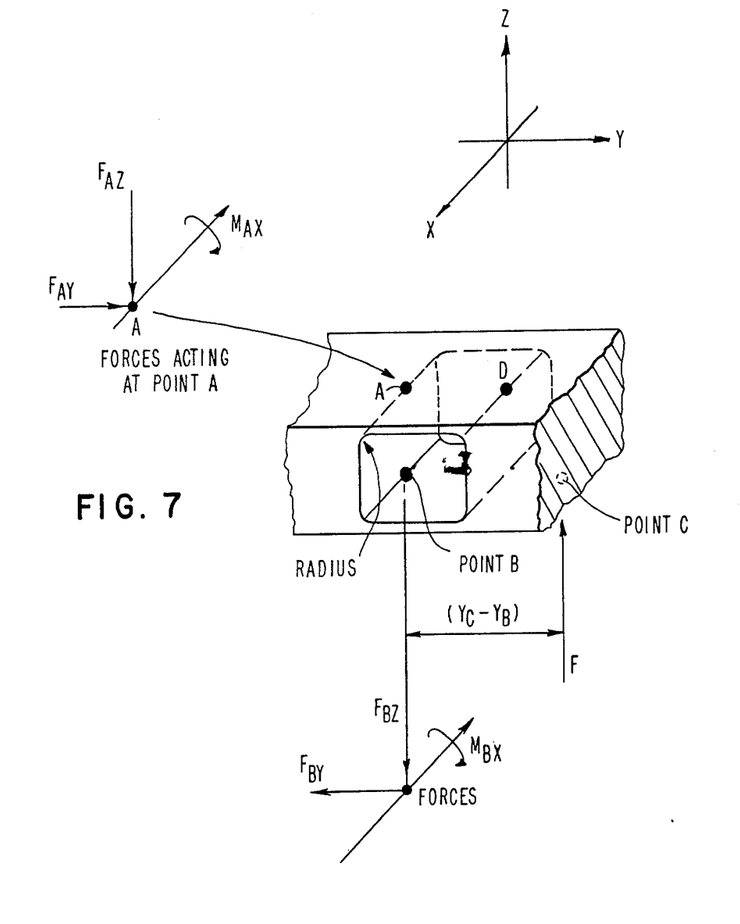
FIG. 7 is a schematic representation showing a parallel beam structure showing the forces acting at the maximum flexure points of a flexure member.

FIG. 6 is a schematic diagram of a flexure member 62 under a stress load W. This radiusing is best seen in FIGS. 2 and 6. A radiusing 60 has the result of moving the maximum flexure points out from the wall and distributing the flexing over a wider area, as can be best seen from FIG. 6A, which is a plot of the stress versus linear distance along the beam from wall to wall. Considering the wall junctions to be at A and D at each end of the flexure member 62, the maximum flexing point is moved out from wall A to point B and moved from from wall D to point C. The new stress points B and C are spread over a wider area which is preferred over the sharp maximum peak stress points shown in FIG. 5. Thus, a region of nearly constant stress is provided. This "flat" peak is an ideal location for a strain gage. Since the stresses at points B and C are of opposite sign and of equal magnitude, two parallel beams can be wired with a 4-active arm strain gauge bridge to produce a sensor that compensates for the effects of extraneous loads. The forces acting at points A and B in a parallel beam structure of a force sensor are reaction forces due to force F as shown in FIG. 7. These reaction forces have been calculated for a typical application where:

$M_{AX}$=0.1F, $M_{BX}$=0.1F, $F_{AY}$=2.0F,
$F_{BY}$=2.0F, $F_{AZ}$=0.5F, $F_{BZ}$=0.5F

As the distance ($Y_C - Y_B$) varies, $F_{AZ}$, $F_{BZ}$, $M_{AX}$ and $M_{BX}$ remain constant.

$F_{AY}$ and $F_{BY}$ vary as the distance ($Y_C - Y_B$) varies when:

($Y_C - Y_B$)=($Y_D - Y_A$), $F_{AY}$=0.45F, $F_{BY}$=0.45F
When ($Y_C - Y_B$)=($Y_D - Y_A$)X2, $F_{AY}$=2.0F, $F_{BY}$=2.0F The above forces are all within a 5% accuracy.

Figure 8:
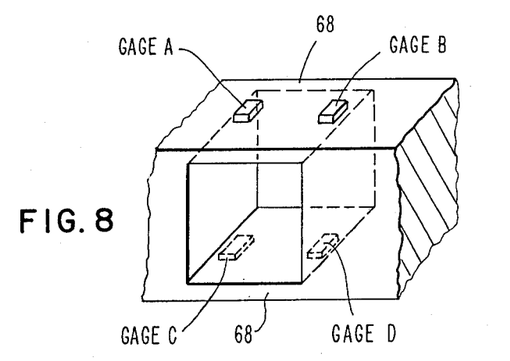
FIG. 8 shows the placement of the strain gages at the maximum flexure points on the flexure members in a parallel beam structure.
Figure 9:
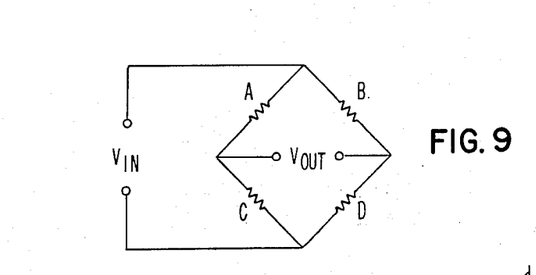
FIG. 9 is a schematic circuit diagram showing the strain gage members of FIG. 8 arranged in a Wheatstone bridge circuit.
Figure 10:
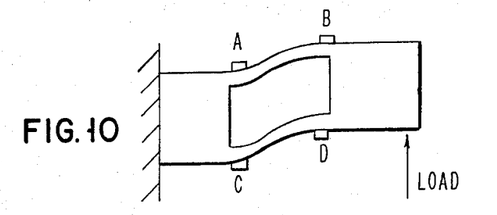
FIG. 10 is a schematic representation showing the strain gages placed at the maximum flexure points on a flexure member and indicating the flexure in an exaggerated condition when placed under a load.

The strain gages A, B, C and D for measuring the flexure of the flexure members 68 are placed at maximum flexure points on the surfaces of the flexure members as shown in FIG. 8. Gage A is placed at the maximum flexure point of the top flexure member at the left hand side and the gage B is placed at the corresponding opposite maximum flexure point at the right hand side. Similarly, gages C and D are placed at the maximum positive and negative flexure points, respectively, on the bottom of the flexure member 68 that gaps or crosses the gap at the bottom thereof, forming the bottom beam of the parallel beam structure. These strain gauges A, B, C and D are wired in a Wheatstone bridge circuit as is shown in FIG. 9, and are represented by corresponding resistance symbols A, B, C and D. The bridge circuit output voltage, $V_{out}$ can be calculated from the following equation:

$$V_{out} = V_{in}\left(\frac{R_A}{R_A + R_C} - \frac{R_B}{R_B + R_D}\right)$$

where $V_{in}$ is the bridge excitation voltage, and $R_A$, $R_B$, $R_C$, $R_D$ are the respective gage resistances in a four-arm active bridge, under no load, $R_A = R_B = R_C = R_D = R$, so $V_{out}=0$ FIG. 10 depicts the flexure of flexure members of a parallel beam structure under load. In this situation gages A and D are in compression and gages B and C are in tension. As the resistance of gages A and D decreases, the resistance of gages B and C increases. Thus, the strain gages are mounted on the flexure member so as to produce changes in resistance which are equal and opposite to one another.

$$\Delta R_A = \Delta R_D = -\Delta R_B = -\Delta R_C = \Delta R_1$$

Under load:

$$V_{out} =$$

$$V_{in}\left[\frac{R + \Delta R1}{(R + \Delta R1) + (R - \Delta R1)} - \frac{R - \Delta R1}{(R - \Delta R1) + (R + \Delta R1)}\right]$$

Therefore:

$$V_{out} = V_{in}\left[\frac{\Delta R1}{R}\right], \text{ under load}$$

Figure 11:
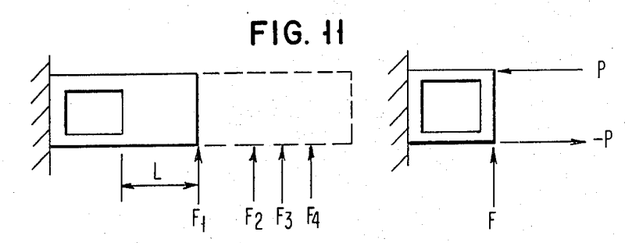
FIG. 11 is a schematic representation of a flexure member illustrating the axial loads encountered by the flexure member.

Axial loads P and −P set up due to the moment F times L in a parallel beam structure is illustrated in FIG. 11. Load P causes a −ΔR2 in gages A and B and load −P causes a +ΔR2 in gages C and D. Therefore, the voltage output equals:

$$V_{out} = V_{in}\left[\frac{R + \Delta R1 - \Delta R2}{(R + \Delta R1 - \Delta R2) + (R - \Delta R1 + \Delta R2)} - \right.$$

$$\left.\frac{R - \Delta R1 - \Delta R2}{(R - \Delta R1 - \Delta R2) + (R + \Delta R1 + \Delta R2)}\right]$$

$$V_{out} = V_{in}\left[\frac{\Delta R1}{R}\right]$$

The sensor arrangement is not sensitive to moments caused by offset loads. The flexure geometry and gage placement tend to make the sensor sensitive only to forces acting along one axis. This becomes evident once it is understood that the flexure design is insensitive to axial loads. The effect of the axial loads is cancelled out by the location of the strain gages on the flexure member and the use of a four active arm strain gage bridge.

It should be noted that transverse forces applied at different distances from the parallel beam structures produces the same sensor output. The transverse load produces a variation in the axial loads P and −P which are opposite and tend to cancel one another out, as shown in FIG. 11. Load P causes a −ΔR2 in gages A and B and load −P causes a +ΔR2 in gages C and D so that ΔR2 equals f (P) and the effects of ΔR2 are cancelled out by the full bridge so that $V_{out}$=f (F$_1$)=f (F$_2$)=f (F$_3$)=f (F$_4$). Thus, the sensor output is the same regardless of how far removed from the parallel beam structure the transverse force is applied. Of course, axial loads applied to both of the radiused parallel beams are not cancelled out if the axial load is in the same direction for both beams. The axial load is applied to the force sensor assembly parallel to the flexure members and is not applied as a transverse force giving opposite axial forces on the flexure members. However, these axial loads tend to have a small effect on the beam stress due to the flexure geometry. This can be seen from the following analysis. As before:

$$V_{out} = V_{in}\left[\frac{R_A}{R_A + R_C} - \frac{R_B}{R_B + R_D}\right]$$

$$\Delta R_A = \Delta R_D = -\Delta R_B = -\Delta R_c = \Delta R_1$$

Where $\Delta R_1$ is the change in gage resistance due to the transverse force F. A positive axial load causes a change $\Delta R_2$ in gages A, B, C and D so $$V_{out} = V_{in}\left[\frac{R + \Delta R1 + \Delta R2}{R + \Delta R1 + \Delta R2 + R - \Delta R1 + \Delta R2}\right] -$$

$$\left[\frac{R - \Delta R1 + \Delta R2}{R - \Delta R1 + \Delta R2 + R + \Delta R1 + \Delta R2}\right]$$

Then $$V_{out} = V_{in}\frac{\Delta R1}{R + \Delta R2}$$

Typically
R = 350 ohms
$\Delta R_1 \leq 0.8$ ohms
$\Delta R_2 \leq 0.1$ ohms $$V_{out} = \frac{\Delta R1}{R}(V_{in})$$

for all practical purposes and the effect of axial loads is negligible.

Figure 12:
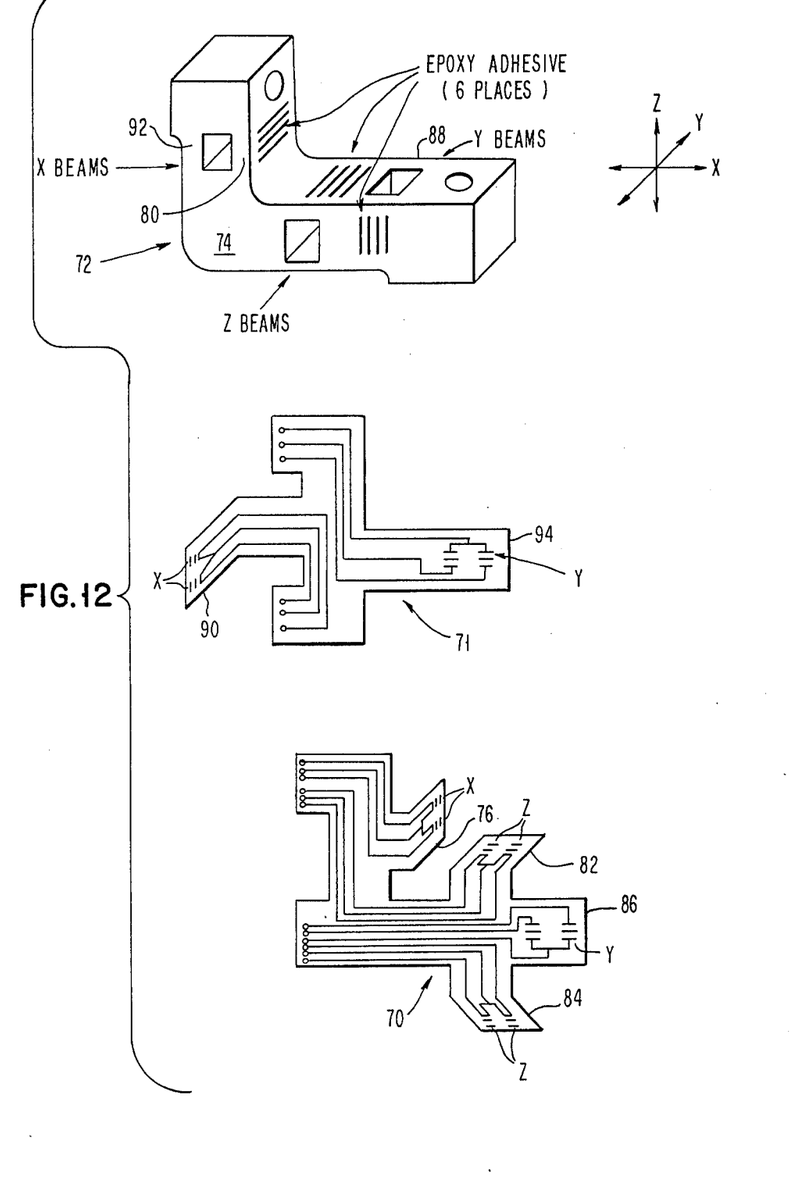
FIG. 12 is a schematic diagram showing the foil strain gages for location at the maximum flexure points of each flexure member arranged in a flat flexible circuit harness.

Another aspect of the present invention is the inclusion of the strain gages in a printed circuit arrangement which consists of a flexible plastic backing wherein the leads to the gages are part of a flexible printed circuit. This is possible since a foil strain gage is essentially a miniature printed circuit. FIG. 12 illustrates the construction of the flexible circuits 70 and 71 and the installation of the circuit on the force sensor assembly 72. As shown, the flexible circuit harness 70 contains a pair of strain gages X, Y and Z for one flexure member of each parallel beam structure plus a second pair for the other parallel flexible Z member. The pairs of the strain gages X, Y and Z are glued to the force sensor assembly 72. The strain gage harness 70 is shaped so as to fit or wrap around the force sensor assembly 72. For example, flex circuit 70 is applied to surface 74 of the force sensor assembly 72 and the tab 76 containing the pair of X strain gages is folded down on the top flexible beam member 80 providing the strain gage arrangement in the right orientation and positioned at the maximum flexure points. Similarly, the tabs 82 and 84 for the upper and lower Z strain gages are glued to the top and bottom flexure members of the Z parallel beam structure so that the gages are at the maximum flexure points. The pair of Y strain gages are attached in a tab 86 adapted to be glued to the side 74 of the assembly placing the strain gages in the correct position with respect to the Y flexure member in the surface 74. The flexible circuit 71 is essentially wrapped on the far side of the L shaped force sensor assembly 72 referred to as side 88. The X strain gages are on the tab 90 which is glued to the bottom flexure member 92 of the X parallel beam structure placing the X strain gages at the maximum flexure points. The Y strain gages are located near the end 94 of the flexible circuit 71 and are positioned and oriented so that when glued to the flexure member of the Y parallel beam structure in the surface 88 of the force sensor assembly, they will be located at the maximum flexure points.

While there has been described what is at present considered to be a preferred embodiment of this invention, it will be obvious to those skilled in the art that various changes and modifications may be made therein without departing from the invention.

What is claimed is:

1. A multi-degree of freedom force sensor for measuring forces applied to gripper fingers in a manipulator or the like when grasping an object therebetween comprising:

a pair of force sensor units each rigidly connected at a first end to a respective finger and at a second end to a drive member for the gripper fingers;

a plurality of parallel beam structures contained in each of said force sensor units, each parallel beam structure comprising a pair of spaced parallel flexure members, a gap, and end walls defining said gap, each of said pair of spaced parallel flexure members bridging said gap between said end walls in each of said parallel beam structures and oriented so that the axes perpendicular to the parallel planes of the parallel flexure members are orthogonal to one another;

a radiused surface section located at both ends and on the facing surfaces of said parallel flexure members where they join said walls in said parallel beam structures of said force sensor units to move the maximum flexure points away from said walls and extend them over a wider area thereby lessening material flexure fatigue; and a plurality of electric circuits, two pairs of strain gages connected in each of said electric circuits with each gage of each pair located at a predetermined opposite maximum flexure point on the surface of each flexure member opposite from the radiused surface section of each flexure member of said parallel beam structures so as to measure the flexure of the flexure member at the predetermined flexure points, which flexure is indicative of the force vector along the axis perpendicular to said parallel flexure members.

2. A force sensor according to claim 1, wherein said force sensor units containing said plurality of parallel beam structures are constructed from one piece, said pairs of parallel flexure members are oriented so as to flex in response to forces along the axes perpendicular to said parallel flexure members and are sufficiently rigid to resist torque motion due to torque forces.

3. A force sensor according to claim 1, wherein each of said force sensor units is identical.

4. A force sensor according to claim 1, wherein each of said pair of force sensor units is an L-shaped member.

5. A force sensor according to claim 4, wherein at least two of said parallel beam structures are located in the long member of the L-shaped member, the parallel flexure members of either one of the parallel beam structures in said long member of said L-shaped member are oriented so that the axis perpendicular to the parallel planes of the parallel flexure members of either parallel beam structure is orthogonal to the axis perpendicular to the parallel planes of the other parallel beam structure.

6. A force sensor according to claim 5 wherein at least one of said parallel beam structures is located in the short member of the L-shaped member and has said parallel flexure members oriented so that the axis perpendicular to the parallel planes of the parallel flexure members is perpendicular to the axes of the parallel flexure members in the long member of said L-shaped member.

7. A force sensor according to claim 1, wherein the two pairs of strain gages placed on a respective parallel beam structure are electrically connected in a Wheatstone bridge circuit with the opposite connected elements of said circuit being comprised of the pair of strain gages located at the maximum flexure points of the respective flexure member.

8. A force sensor according to claim 1, wherein said plurality of pairs of strain gages and said plurality of parallel beam structures individually sense forces in respective X, Y and Z directions, thereby providing three degrees of freedom sensing of forces.

9. A force sensor according to claim 1, wherein said two pairs of strain gauges connected in each of said plurality of electric circuits are foil type strain gauges and said plurality of electric circuits including said foil type strain gauges comprise a first and second flat, flexible printed circuit harness in which said plurality of pairs of strain gauges are located adjacent the corresponding maximum flexure points in said flexure members in each parallel beam structure when said printed circuit harness is wrapped around said force sensor unit.

10. A force sensor according to claim 9, wherein said first flat flexible printed circuit includes pairs of strain gauges for measuring the flexure at the opposite maximum flexure points of a flexible member of a parallel beam structure oriented for measuring force vectors in the X, Y and Z directions and a further pair of strain gauges for measuring the flexure at opposite maximum flexure points of a further flexible member of a parallel beam structure oriented for measuring further force vectors in the Z direction.

11. A force sensor according to claim 9, wherein said second flat flexible printed circuit harness includes pairs of strain gauges for measuring the flexure at the opposite maximum flexure points of a flexible member of a parallel beam structure oriented for measuring force vectors in the X and Y directions.

* * * * *